United States Patent [19]

Baas

[11] Patent Number: 4,796,249

[45] Date of Patent: Jan. 3, 1989

[54] SYSTEM TO ASCERTAIN THE SCANNING SPEED OF AUDIO DISKS WITH CONTACTLESS SCANNING

[75] Inventor: Dieter Baas, Kehl, Fed. Rep. of Germany

[73] Assignee: Deutsche Thomson-Brandt GmbH, Villingen-Schwenningen, Fed. Rep. of Germany

[21] Appl. No.: 943,258

[22] PCT Filed: Mar. 8, 1986

[86] PCT No.: PCT/EP86/00127

§ 371 Date: Nov. 4, 1986

§ 102(e) Date: Nov. 4, 1986

[87] PCT Pub. No.: WO86/05310

PCT Pub. Date: Sep. 12, 1986

[30] Foreign Application Priority Data

Mar. 9, 1985 [DE] Fed. Rep. of Germany ....... 3508423

[51] Int. Cl.$^4$ .............................................. G11B 7/00
[52] U.S. Cl. .................................... 369/50; 360/69; 358/342; 369/44; 369/43; 369/54; 369/58; 369/133; 369/240
[58] Field of Search ............. 369/53, 54, 56–58, 369/133, 240, 50, 32, 33, 43–47, 111; 360/71, 72.1, 73, 74.2, 69; 358/342

[56] References Cited

U.S. PATENT DOCUMENTS

| | | | |
|---|---|---|---|
| 4,388,713 | 6/1983 | Tatsuguchi | 369/111 X |
| 4,641,294 | 2/1987 | Yoshimaru | 369/111 X |
| 4,675,855 | 6/1987 | Iso et al. | 369/111 X |
| 4,680,746 | 7/1987 | Senso | 369/111 X |

Primary Examiner—Robert L. Richardson
Attorney, Agent, or Firm—Max Fogiel

[57] ABSTRACT

In order to reach precisely a predetermined place on an audio disk during a search run with contactless scanning, the scanning speed is determined from the speed of rotation of the disk. This occurs preferably at the beginning of the first recorded piece. The information concerning the speed of rotation of the disk is determined from the radial error signal. The arrangement is adapted for determining scanning speeds that vary among disks, and where each disk has a scanning speed that is unique to the disk and differs from the scanning speed of another disk.

11 Claims, 2 Drawing Sheets

SYSTEM TO ASCERTAIN THE SCANNING SPEED OF AUDIO DISKS WITH CONTACTLESS SCANNING

The invention concerns a system for determining the scanning speed of audio disks with remote scanning.

BACKGROUND OF THE INVENTION

Any point on an audio disk that is scanned remotely can be rapidly located by calculating the tracks between the starting point and the target point. The number of tracks between the starting diameter, which is established in accordance with the standards at do=50 mm, and the scanning point accordingly depends on the scanning speed Vo. Scanning speed Vo is specific to each disk and can in accordance with the standards be between 1.2 and 1.4 m/sec. A specific scanning speed Vo is established for calculating the number of tracks. This leads, when a disk has a scanning speed that deviates from this value, to not inconsiderable errors as the skip width increases.

SUMMARY OF THE INVENTION

The object of the invention is to determine the disk-specific scanning speed at low expenditure.

Once the disk-specific scanning speed has been determined, the exact number of tracks between the starting and target points can be determined. This makes it possible to attain the target point of any disk in one skip without corrective measures. The results is substantially shorter access times.

The invention will now be specified with reference to the drawing.

DESCRIPTION OF THE PREFERRED EMODIMENTS

Figure 1:
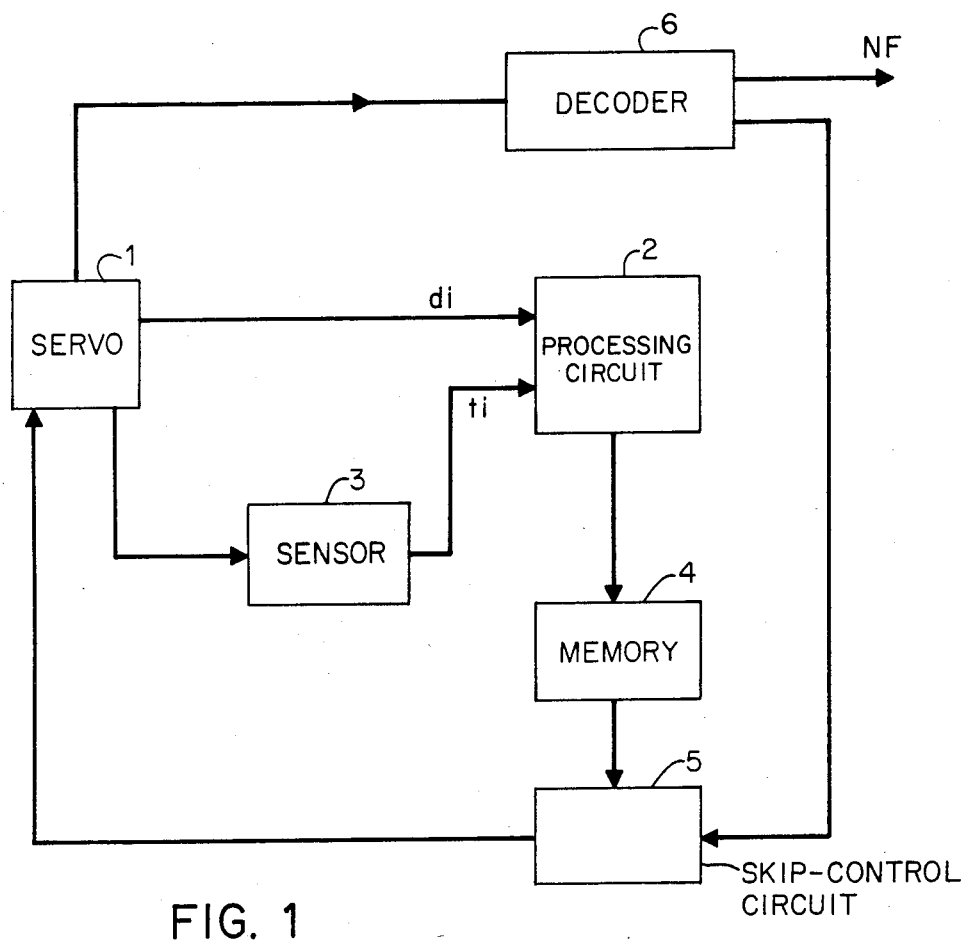
FIG. 1 is a schematic diagram of a system for determining the scanning speed of audio disks with remote scanning, in accordance with the present invention.

FIG. 1 is a block diagram demonstrating how the scanning speed is determined. A servo and pickup system 1 supplies both the read-out data to a decoder 6 that generates a low-frequency signal and the data prescribed by servo system 1, like the actual diameter di that results from the actual position of the scanner on the disk and the duration of revolution ti, in conjunction with a separate sensor 3 if necessary, to a processing circuit 2 for determining the scanning speed. The results from processing circuit 2 are retained in a memory 4 and the skip coordinates for example called up from a skip-control circuit 5 during the calculation. Skip-control circuit 5 also obtains the actual address data that are part of the data flow from decoder 6. The output terminal of skip-control circuit 5 is connected to the control-input terminal of pickup system 1. It is also possible to supply the address data to processing circuit 2. If address data that are in a definite relation between disk diameters di, like the starting point of the first piece (do=50 mm) for instance, are present, the position will be determined by the address data. In this case the information as to the actual diameter di can be eliminated from sensor system 1.

Servo circuit 1 generates a radial error signal UR that is employed for readjusting the fine and coarse drive mechanism. Signal UR can also be employed to determine disk rotation. The frequency of rotation of the error signal is then determined from the low-pass filtered radial error signal to determine scanning speed Vo. The scanning speed can easily be determined from the mathematical equation $$Vo = \pi \cdot di \cdot fi = \pi \cdot di \cdot 1/ti$$

wherein fi is the frequency of the error signal and ti is that of the sensor signal. The speed of rotation of the disk in the vicinity of inner diameter do is about 8 rps. The beat defect is accordingly exploited to determine scanning speed. If a disk has several eccentricities, frequency fi will be a whole multiple of the speed of approximately 8 rps. In this case, it will be divided by a factor thereof.

In case the disk has no eccentricities, a scanning speed Vo in the vicinity of 1.2 to 1.4 m/sec will be prescribed. This situation, however, hardly occurs in practice.

Figure 2:
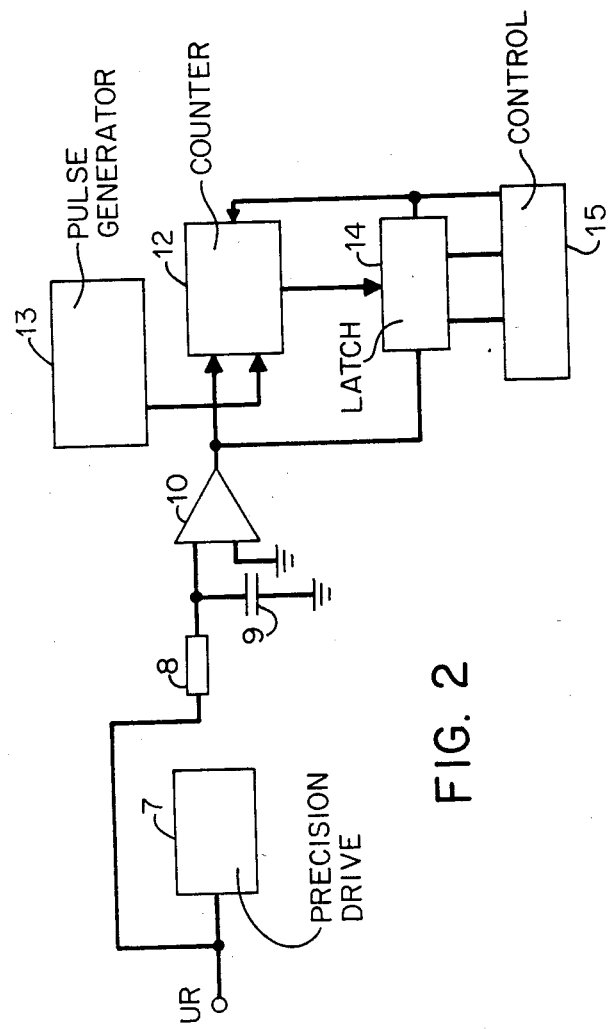
FIG. 2 is a schematic diagram of another embodiment of the arrangement of FIG. 1.

FIG. 2 illustrates a circuit for measuring disk rotation without an additional decoder. A radial error signal UR is supplied both to a precision drive mechanism 7 and, through a low pass 8 and 9, to a comparator 10. The output terminal of comparator 10 leads to the input terminal of a counter 12. Another input terminal on counter 12 is connected to a pulse generator 13. The output terminals of counter 12 are connected through a latch 14 to controls 15 that compute scanning speed Vo from the counting results obtained from counter 12. One output from controls 15 is connected to an input terminal of counter 12 and to an input terminal of latch 14 and functions as a starting and measuring release signal.

The speed of rotation can also be determined by means of a device mounted for that purpose on the turntable, like the sensor 3 illustrated in FIG. 1, independent of the frequency of the radial error signal. This can be done by means of a mark applied to the drive side of the disk and optically scanned for instance.

What is claimed is:

1. A constant linear velocity system for determining the scanning speed of audio disks with remote scanning, comprising: an audio disk; means for rotating said disk; and means for determining the speed of rotation of said audio disk at a predetermined point on said disk. scanning speeds of disks varying among the disks, each disk having a scanning speed that is unigue to the disk and differs from the scanning speed of another disk whose scanning speed is to be determined.

2. A system as defined in claim 1, wherein said predetermined point is at the beginning of a first piece of music.

3. A system as defined in claim 1, wherein the speed of rotation of said audio disk is obtained from a filtered frequency of a radial-error signal.

4. A system as defined in claim 1, wherein the speed of rotation of said audio disk is obtained from a filtered frequency of a focus-error signal.

5. A system as defined in claim 1, wherein the speed of rotation of said audio disk is determined at any point where the position of the point is known.

6. A system as defined in claim 3, wherein the said disk has a number of eccentricities, the frequency of the radial-error signal being dependent on the number of eccentricities of the disk.

7. A system as defined in claim 6. wherein the frequency of the radial-error signal is substantially 8 Hz in vicinity of a first piece of music when said disk has only one radial eccentricity.

8. A system as defined in claim 7, wherein a whole multiple of the frequency is divided by a predetermined factor.

9. A system as defined in claim 1, wherein said disk has marks on the drive side of said disk, the speed of rotation of said disk being determined by processing said marks.

10. A constant linear velocity system for determining the scanning speed of audio disks with remote scanning, comprising: an audio disk; means for rotating said disk; and means for determining the speed of rotation of said audio disk at a predetermined point on said disk, scanning speeds of disks varying among the disks, each disk having a scanning speed that is unigue to the disk and differs from the scanning speed of another disk whose scanning speed is to be determined; said means for determining the speed of rotation of said audio disk at a predetermined point in said disk comprising servo means, decoder means receiving read out data from said servo means and generating a low-frequency signal, a data processor receiving from said servo means data on the actual diameter resulting from the actual position of a scanner on said disk and the duration of revolution, said processing circuit determining the scanning speed, memory means connected to said processing circuit for storing results from said processing circuit. skip-control circuit means connected to said memory means, said memory means storing also skip coordinates for said skip-control circuit means, said skip-control circuit means receiving also actual address data from said decoder means, said skip-control circuit means having an output connected to an input of said servo means, said servo means generating a radial error signal for determining disk rotation.

11. A constant linear velocity system for determining the scanning speed of audio disks with remote scanning, comprising: an audio disk; means for rotating said disk; and means for determining the speed of rotation of said audio disk at a predetermined point on said disk, scanning speeds of disks varying among the disks, each disk having a scanning speed that is unique to the disk and differs from the scanning speed of another disk whose scanning speed is to be determined; said means for determining the speed of rotation of said audio disk at a predetermined point on said disk comprising precision drive means receiving a radial error signal, comparator means receiving also said radial error signal through a low pass filter, counter means having an input connected to the output of said comparator, pulse generator means connected to another input of said counter latch means connected to an output of said counter, control means connected to said latch means and computing scanning speed from the count obtained from the output of said counter means, said control means having one output connected to a further input of said counter means and to a further input of said latch means, said output from said control means providing a starting and measuring release signal.

* * * * *